United States Patent Office 2,793,198
Patented May 21, 1957

2,793,198

FILLED SILICONE RUBBER HAVING LOW SHRINKAGE CHARACTERISTICS

Ben A. Bluestein, Schenectady, N. Y., assignor to General Electric Company, a corporation of New York No Drawing. Application December 3, 1953, Serial No. 396,069

6 Claims. (Cl. 260—37)

This invention is concerned with organopolysiloxanes convertible by heat or other suitable means to the cured, solid, elastic state, which exhibit reduced shrinkage properties, especially while being cured or later used in applications requiring long exposures to elevated temperatures.

One of the objects of this invention is to produce the shrinkage of molded silicone rubber products.

A still further object of the invention is to reduce the time required to effect satisfactory curing of heat-convertible organopolysiloxanes.

A still further object of the invention is to eliminate explosion hazards often attendant during the heat-curing of convertible organopolysiloxanes to the substantially infusible and insoluble state.

Other objects of the invention will become apparent from the description thereof which follows.

Convertible organopolysiloxanes (e. g., convertible by heat, by irradiation with high energy electrons as disclosed and claimed in Lewis and Lawton application, Serial No. 291,542, filed June 3, 1952, now Patent No. 2,763,609, and assigned to the same assignee as the present invention, etc., to the cured, solid, elastic state) are known to have good heat resistance at elevated temperatures. However, in molding operations where the convertible organopolysiloxane is employed in combination with fillers (and curling agents, if desired) therefor, it has been found that during the molding process, the convertible organopolysiloxane may shrink in size from about 7 to 15% of the mold dimension after removal from the mold and subsequent heat-treatment to insure essentially complete conversion of the organopolysiloxane to the solid, elastic, substantially cured (e. g., infusible and insoluble) state. Obviously such high shrinkage characteristics are undesirable because it makes it difficult to maintain close dimensional tolerances. In addition, the loss of such volatile materials during the molding and heat-treating process represents a material economic loss due to the difficulty of recovering the volatile materials which may be volatilized during the elevated temperature cure.

I have now discovered that the shrinkage characteristics of convertible organopolysiloxanes can be materially reduced if one removes prior to curing of the latter to the substantially infusible and insoluble state, essentially all the volatile, low molecular weight (below 500 molecular weight) materials boiling below about 250° C. at atmospheric (760 mm.) pressure. As a result of the removal of the volatile materials (which generally include low molecular weight cyclic diorganosiloxanes, for instance, cyclopolydimethylsiloxanes, such as octamethylcyclotetrasiloxane, decamethylcyclopentasiloxane, hexaethylcyclotrisiloxane, trimer of methyl ethylsiloxane, etc.), it is possible to effect curing, that is conversion of the heat-convertible organopolysiloxane to the substantially infusible and insoluble state both in a mold and in a subsequent heat treatment whereby the dimensions of the final heat-treated product are only slightly smaller than the dimensions of the original product when molded. In addition, the volatiles which are removed from the convertible organopolysiloxane prior to molding may be readily recovered and reprocessed with the usual condensing agents, for instance, alkaline condensing agent, such as sodium hydroxide, potassium hydroxide, etc., or acidic type catalysts, for instance, ferric chloride, etc., to make available new quantities of the heat-convertible organopolysiloxane.

The manner whereby the presence of these volatile organopolysiloxanes occurs may be illustrated by reference to the preparation of convertible methylpolysiloxanes. Thus, in the preparation of methylpolysiloxanes which are convertible to the cured, solid, elastic state, one usually polymerizes a low molecular weight methylpolysiloxane such as octamethylcyclotetrasiloxane by means of alkaline agents, such as potassium hydroxide, to a material of high molecular weight having viscosities ranging from about 500,000 to approximately 20,000,000 centipoises, which materials are extremely viscous or are gummy solids. These high molecular weight convertible polydimethylsiloxanes have been found to contain from about 10 to 15 percent, by weight thereof, of low molecular weight methylpolysiloxanes of similar structure as the high molecular weight product (that is, having a plurality of dimethylsiloxy units) and boiling below 250° C. at 760 mm., which volatiles comprise cyclic polydimethylsiloxanes, for example, octamethylcyclotetrasiloxane, decamethylcyclopentasiloxane, dodecamethylcyclohexasiloxane, etc.

In the specification and claims, the convertible organopolysiloxanes, which may be highly viscous masses or gummy solids, depending upon the state of condensation will hereinafter be referred to as "convertible organopolysiloxanes" or more specifically as "convertible methylpolysiloxanes." Although convertible organopolysiloxanes with which the present invention is concerned are now well known in the art, for purposes of showing persons skilled in the art the various convertible organopolysiloxanes which may be employed in the practice of the present invention, attention is directed to the convertible organopolysiloxanes containing less than 0.2 mol percent (preferably the heat-convertible organopolysiloxanes should be free of any copolymerized mono-organosiloxane) copolymerized mono-organosiloxane disclosed and claimed in Agens Patent 2,448,756 and Sprung et al. Patent 2,448,556, both issued September 7, 1948, in Sprung Patent 2,484,595, issued October 11, 1949, or in Krieble et al. Patent 2,457,688, issued September 28, 1948, all the foregoing patents being assigned to the same assignee as the present invention; as well as in Warrick Patent 2,460,795. It will, of course, be understood by those skilled in the art that the heat-convertible organopolysiloxane may contain the same or different silicon-bonded organic substituents (e. g., methyl, ethyl, propyl, phenyl, tolyl, xylyl, benzyl, phenylethyl, naphthyl, chlorophenyl, both methyl and phenyl, both methyl and chlorophenyl, etc., radicals) connected to the silicon atoms by carbon-silicon linkages.

The particular convertible organopolysiloxane used in the practice of this invention is not critical and is advantageously obtained by hydrolyzing a diorganodihydrolyzable silane, for instance, dimethyldichlorosilane, mixtures of dimethyldichlorosilane and diphenyldichlorosilane, mixtures of dimethyldichlorosilane and methylphenyldichlorosilane, etc. (with or without the presence of small amounts of mono-organotrihydrolyzable silanes or triorganohydrolyzable silanes, e. g., methyltrichlorosilane, trimethylchlorosilane, etc.), and thereafter effecting condensation of the hydrolysis product using, for instance, an alkaline condensing agent, such as potassium hydroxide or an acidic condensing agent, such as ferric chloride, for the purpose.

Generally, it is desirable that the convertible organopolysiloxanes comprise the recurring structural unit RR'SiO where R and R' are monovalent hydrocarbon radicals, many examples of which have been given above, for instance, alkyl, aryl, aralkyl, alkaryl, halogenated aryl, etc., radicals. It is also desirable that in the convertible organopolysiloxane, the majority of the R and R' radicals, be lower alkyl radicals, for instance, methyl radicals and that such dialkylsiloxy units comprise at least 50% of the total number of organic groups bound to the silicon atoms by carbon-silicon linkages. It is usually preferred that the organopolysiloxane from which the heat curable organopolysiloxanes are prepared contain an average of from about 1.98 to 2.1, preferably from 1.998 to 2.01 organic groups, for instance, methyl groups, total methyl and phenyl groups, etc., per silicon atom and more than 98%, for example, more than about 99.8% of the silicon atoms of the polysiloxane contain two silicon-bonded organic groups, for instance, alkyl groups or mixture of alkyl and aryl groups, etc., per silicon atom.

The attainment of the low-shrink convertible organopolysiloxane is advantageously accomplished by removing the lower molecular weight volatile organopolysiloxanes boiling below 250° C., either in the presence or absence of any filler or other additives. For optimum results, it is essential that on a weight basis, less than 2% of these volatile materials should be present in the convertible organopolysiloxane. The removal of the volatile materials of similar structure (i. e., having a plurality of the same recurring structural units) may be effected by various means. One method comprises heating the convertible organopolysiloxane at elevated temperatures of the order of from about 100° to 300° C., preferably, under reduced pressure, wherein more moderate temperatures can be employed. Another method for removing the volatile materials from the convertible organopolysiloxane comprises employing a selective solvent extraction process whereby liquids are employed in which the low molecular weight, volatile products boiling at or below 250° C. are soluble, but in which the higher molecular weight heat-convertible organopolysiloxanes are substantially insoluble. Among such liquids may be mentioned, for instance, ethanol, butyl alcohol, isopropanol, various ketones, etc., and mixtures of these liquids. A still further method which may be employed involves polymerizing the hydrolyzed diorganodihydrolyzable silane described above in solution whereby the lower molecular weight volatile products are dissolved in the solvent used for the polymerization, while the higher molecular weight products (which will be employed in future processing for conversion to the cured, solid, elastic state) are insoluble and separate readily.

It is advantageous when heating the heat-convertible organopolysiloxane at the elevated temperatures required under reduced pressure to effect volatilization of the low boiling volatiles, first to neutralize any polymerization catalyst which may be present in the convertible organopolysiloxane in order to prevent undesirable depolymerization of the convertible organopolysiloxane. It will, of course, be apparent to those skilled in the art, that the removal of the low boiling volatiles (this term will hereinafter be intended to include and consist essentially of volatiles boiling below 250° C. at atmospheric pressure of about 760 mm. and having an average molecular weight of below 500) may be carried out even when the convertible organopolysiloxane has previously been mixed with a filler, for instance, silica aerogel, calcium carbonate, diatomaceous earth, other finely divided silicas, etc. After removal of the low boiling volatiles, various fillers may be incorporated as, for instance, those described above as well as iron oxide, titanium dioxide, lithopone, etc. The amount of filler (mixtures of fillers may also be used) employed may be varied widely and may comprise, for instance, from about 25 to 300% of the weight of the convertible organopolysiloxane. The exact amount of filler employed will depend upon such factors as, for instance, the application for which the convertible organopolysiloxane is intended, type of convertible organo polysiloxane and filler employed, etc.

In order to accelerate the cure of the devolatilized convertible organopolysiloxane, it is desirable to add to the latter various curing agents (which should not be present during the devolatilization step), for example, benzoyl peroxide, tertiary butyl perbenzoate, etc. These curing agents may be present in various amounts ranging from about 0.5 to as high as 8 percent, by weight, or more, based on the weight of the convertible organopolysiloxane.

Molding compositions from the devolatilized convertible organopolysiloxane may be prepared by mixing together on suitable milling rolls the devolatilized convertible organopolysiloxane, filler, and curing agent. Thereafter, the molding compound (if that is the intended purpose) may be heated in a closed mold for about 10 to 30 minutes or more at temperatures ranging from about 110° to 150° C., and thereafter further heat-treated outside the mold, preferably in an air-circulating oven for varying lengths of time, e. g., from 12 to 36 hours or more at temperatures ranging from about 200 to 250° C. It will be found that after these two curing cycles, namely, the mold and out-of-the-mold curing cycles, the percentage shrinkage of the molded product will be considerably lower than the percentage shrinkage of products from which the low boiling volatiles have not been removed.

In order that those skilled in the art may better understand how the present invention may be practiced, the following example is given by way of illustration and not by way of limitation. All parts are by weight.

EXAMPLE 1

Substantially pure dimethyldichlorosilane was hydrolyzed with water to give a mixture of cyclic dimethylsiloxanes. This reaction product was thereafter processed in order to remove and isolate substantially pure octamethylcyclotetrasiloxane boiling at about 175° C. A heat-convertible methylpolysiloxane was prepared from the octamethylcyclotetrasiloxane (hereinafter referred to as "tetramer") by mixing the latter with about 0.01%, by weight, thereof KOH and heating the aforesaid mixture of ingredients at a temperature of about 150° C. for about 4 hours. At the end of this time, there was obtained a highly viscous polymeric dimethylsiloxane having scarcely any flow at room temperature. To 200 parts of this highly viscous polydimethyl siloxane was added 90 parts silica aerogel (Santocel C) and the two ingredients were compounded on a mill to form a series of thin sheets. These sheets were then placed in an air-circulating oven maintained at a temperature of 250° C. and heated at the latter temperature for about one hour until essentially all (about 98%) of the material boiling below 250° C. had been volatilized. This represented a weight loss of about 15% of the original heat-convertible methylpolysiloxane. About 3.3 parts benzoyl peroxide was then intimately milled into 258 parts of the mixture of the devolatilized heat-convertible methylpolysiloxane and silica aerogel. This latter mixture of ingredients was then molded in a press maintained at a temperature of about 150° C. for about 15 minutes at a pressure of about 500 p. s. i. and thereafter heat-aged for varying lengths of time at 250° C. During this molding operation and the various heat-aging tests, the percent linear shrinkage from a 6" x 6" mold was calculated as well as the percent weight loss of the sample together with the change in tensile strength and elongation. The same tests were conducted on a similarly prepared (using same filler and curing agent as well as the same amounts of these ingredients) and subsequently molded product compounded from a heat-convertible methylpolysiloxane which was not heated, i. e., devolatilized, at 250° C. prior to the molding operation. The results of all these tests are given below in Table I.

*Table 1*

|  | Cure | Control Compound | Devolatilized Compound |
|---|---|---|---|
| Percent Linear Shrinkage From 6″ x 6″ mold. | Press Cure | 2.9% | 2.6%. |
|  | 250° C. for 1½ hrs | 5.1% | 2.9%. |
|  | 250° C. for 18 hrs | 5.2% | 3.0%. |
|  | 250° C. for 82 hrs | 5.7% | 3.1%. |
| Percent Weight Loss Over Press Cure. | 250° C. for 18 hrs | 6.8% | 0.7%. |
|  | 250° C. for 82 hrs | 7.8% | 2.7%. |
| Tensile | 250° C. for 18 hrs | 760 p. s. i. | 740 p. s. i. |
|  | 250° C. for 82 hrs | 690 p. s. i. | 840 p. s. i. |
| Percent Elongation | 250° C. for 18 hrs | 210% | 140%. |
|  | 250° C. for 82 hrs | 180% | 150%. |

I have also found that in addition to exhibiting reduced shrinkage characteristics, cured organopolysiloxanes employing the above-described convertible organopolysiloxanes from which have been removed volatile organopolysiloxanes boiling below 250° C. when measured at 760 mm., also show improved tensile strength while at the same time maintaining comparable and in some respects superior percents elongation. The following examples show the advantages to be derived from the use of the devolatilized organopolysiloxane.

EXAMPLE 2

In this example, the convertible methylpolysiloxane described above in Example 1 was neutralized by incorporating therein a small amount of triphenyl phosphate in accordance with the method described and claimed in the copending application of Robert G. Linville, Serial No. 363,940 (now U. S. 2,739,952, issued March 27, 1956), filed June 24, 1953, and assigned to the same assignee as the present invention. Thereafter this neutralized convertible methylpolysiloxane was subjected to an intensive kneading action and air stripping action in the manner described in the copending application of John F. Blumenfeld and Robert L. Hatch, Serial No. 296,068, now Patent No. 2,695,258 filed concurrently herewith and assigned to the same assignee as the present invention whereby substantially all the low boiling volatile methylpolysiloxanes were removed to leave behind a convertible methylpolysiloxane of which at most 0.7%, by weight thereof, were these low boiling volatile methylpolysiloxanes (in contrast to 15 weight percent prior to devolatilization). Using this devolatilized methylpolysiloxane, varying amounts of silica aerogel were added to 100 parts of the former as well as about 1.65 parts benzoyl peroxide. As a control similar formulations were prepared but using instead a convertible methylpolysiloxane which still contained the volatile methylpolysiloxanes and which had not been neutralized with the triphenylphosphate. The following Table II shows the various formulations employed in each case including the weight amounts of the convertible methylpolysiloxane (identified as "Polymer") and the silica aerogel filler. Samples No. 1, 2, and 3 used the non-devolatilized polymer while samples 4, 5, and 6 employed the above-described devolatilized polymer. Each sample formulation was aged at room temperature for about one day and thereafter molded similarly as was described in Example 1 in a mold for about 15 minutes at 150° C. under a pressure of about 500 p. s. i. Thereafter the samples were heat-aged for the periods recited in the table with the results therein described.

*Table II*

|  | Sample No. | | | | | |
|---|---|---|---|---|---|---|
|  | 1 | 2 | 3 | 4 | 5 | 6 |
| Parts Polymer | 100 | 100 | 100 | 100 | 100 | 100 |
| Parts Silica Aerogel | 40 | 45 | 50 | 40 | 45 | 50 |
| Aging: | | | | | | |
| 1 Hr./150° C.— | | | | | | |
| Tensile Strength, p. s. i | 794 | 759 | 651 | 946 | 954 | 950 |
| Percent Elongation | 420 | 360 | 310 | 360 | 330 | 330 |
| 24 Hrs./250° C.— | | | | | | |
| Tensile Strength, p. s. i | 522 | 609 | 519 | 801 | 812 | 849 |
| Percent Elongation | 350 | 380 | 230 | 310 | 290 | 270 |
| 72 Hrs./250° C.— | | | | | | |
| Tensile Strength, p. s. i | 605 | 652 | 626 | 752 | 708 | 838 |
| Percent Elongation | 315 | 285 | 240 | 255 | 225 | 230 |

EXAMPLE 3

Employing the same devolatilized and non-devolatilized convertible methylpolysiloxanes described in Example 2 above, formulations embodying each of these convertible methylpolysiloxanes were prepared comprising, by weight, 100 parts of the polymer, 40 parts silica aerogel, and 1.65 parts benzoylperoxide. Samples of each formulation were molded similarly as described in Example 2 into the form of flat sheets and thereafter heat-aged for varying lengths of time at 250° C. during which time periodic tests were made of the tensile strength and percent elongation of each sample. Sample No. 7 employed the non-devolatilized convertible methylpolysiloxane while sample No. 8 employed the devolatilized polymer described above. The following Table III shows the results of the various tests conducted on these formulations after the respective heat agings.

*Table III*

| Hours at 250° C | 1 | 2 | 3 | 4 | 5 | 6 | 7 |
|---|---|---|---|---|---|---|---|
| Sample No. 7: | | | | | | | |
| Tensile Strength, p. s. i | 565 | 584 | 566 | 590 | 611 | 640 | 640 |
| Percent Elongation | 335 | 320 | 300 | 300 | 320 | 350 | 330 |
| Sample No. 8: | | | | | | | |
| Tensile Strength, p. s. i | 851 | 831 | 646 | 784 | 897 | 758 | 820 |
| Percent Elongation | 350 | 320 | 270 | 300 | 325 | 280 | 280 |

Reference to Table III shows that the strength characteristics of the cured products employing the devolatilized gum are better than the strength properties of the cured silicone rubber employing the non-devolatilized polymer. Differences in per cent elongation between sample No. 7 and sample No. 8 are of little significance.

It will, of course, be understood by those skilled in the art that other convertible organopolysiloxanes, fillers, curing agents and curing means may be employed in place of those used in the foregoing example without departing from the scope of the invention. Instead of using the polymeric diorganosiloxanes, for example, polymeric dimethylsiloxane, containing about 2.0 organic groups, e. g., methyl groups, per silicon atom, organopolysiloxanes containing up to at most 0.2 mol percent copolymerized mono-organosiloxane, for example, copolymerized monomethyl siloxane, or containing up to 0.02 mol percent copolymerized trimethyl siloxy units [$(CH_3)_3SiO$] also may be used. Obviously, the proportions of ingredients employed in the practice of the present invention may be varied widely and no intent is to be read into the present description that the limits of the ingredients described are the only ones intended.

As will be apparent to those skilled in the art, other methods for removing the low molecular volatiles from the convertible organopolysiloxane boiling below 250° C. may be employed. In addition to the methods described in the above description and example above, a still further method for removing the low-boiling volatiles (i. e., those boiling below 250° C. at 760 mm.) from the convertible organopolysiloxane (as employed in Examples 2 and 3) comprises intensively kneading the convertible organopolysiloxane at elevated temperatures in a suitable mixer, e. g., a dough mixer, and simultaneously passing a gas such as either air or steam through the chamber containing the convertible organopolysiloxane so as to effect contact between the gas and the organopolysiloxane. Kneading action forces the gas bubbles into contact with the volatile organopolysiloxanes which can then be diffused into the gas phase. Further kneading brings the bubbles of gas to the surface releasing the gas and gas-containing volatiles which can then be collected in a suitable apparatus. In this connection it is desirable that any polymerizing agent used to make the convertible organopolysiloxane be either neutralized or removed. The temperature of the stripping gas can be varied from about room temperature (if air is used) to 150°–180° C. (if steam is used). The volatiles can be removed by simply heating and kneading the convertible organopolysiloxane under high vacuum. This method for removing the low molecular weight volatiles from the convertible organopolysiloxane is more particularly disclosed and claimed in the copending application of John P. Blumenfeld and Robert L. Hatch Serial No. 296,068, filed concurrently herewith and assigned to the same assignee as the present invention.

The heat-converted products obtained from the devolatilized convertible organopolysiloxanes are useful in applications in which dimensional stability of the cured silicone rubber is essential, not only for utility purposes but also for economical purposes. In this connection, gaskets requiring close tolerances may be molded with scarcely any compensation being required for shrinkage of the molded product after removal from the mold or after it has been placed in commercial use whereby its effectiveness as a gasket may materially be reduced because of the loss of the volatiles at elevated temperatures and shrinkage of the gasket. In addition, the devolatilized organopolysiloxane may be employed to make insulation for electrical conductors and tubings, for instance, by extrusion, whereby wall thicknesses can be maintained within close tolerance without excessive caution being necessary to take into consideration the decrease in wall thickness due to volatilization of any of the low molecular weight products present in the convertible organopolysiloxane. Moreover, any contaminating or deleterious effects of the volatilizing organopolysiloxanes are materially reduced as a result of the absence of the volatiles in the converted product.

The use of the above-described convertible organopolysiloxanes containing at most 2%, by weight, volatile, low molecular weight products boiling below 250° C. in combination with compression set additives to give cured, filled products having compression set properties better than those of molded materials made with a non-devolatilized convertible organopolysiloxane, is more particularly disclosed and claimed in the copending application of Frederick M. Lewis, Serial No. 396,066, filed concurrently herewith and assigned to the same assignee as the present invention.

The convertible organopolysiloxanes substantially free of the above-mentioned low boiling organopolysiloxanes in addition to having low shrink characteristics after conversion to the cured, solid, elastic state, have the additional property of being more easily millable in shorter periods of time with certain finely divided fillers, particularly finely divided silica fillers, than is possible using convertible organopolysiloxanes from which these low boiling volatile materials have not been removed. Thus, it has been found that when a convertible methyloplysiloxane from which have been removed the low boiling volatile methylpolysiloxanes boiling at 250° C. when measured at 760 mm., is mixed with a finely divided silica, specifically fumed silica, the time required to form a homogeneous sheet on the milling roll after the filler is incorporated on the rolls with the convertible methylpolysiloxane is of the order of about 10 to 20% of the time required to obtain an analogous homogeneous sheet when a convertible methylpolysiloxane is employed with the fumed silica in which the aforesaid low molecular weight methylpolysiloxanes are still present in the convertible methylpolysiloxane.

What I claim as new and desire to secure by Letters Patent of the United States is:

1. The process which comprises (1) removing from a composition consisting essentially of an alkaline-condensed organopolysiloxane having a viscosity of at least 500,000 centipoises, the volatile low molecular weight organopolysiloxanes present therein and boiling below 250° C. when measured at 760 mm. to a point where less than 2%, by weight, of the convertible organopolysiloxane comprises the aforementioned volatile organopolysiloxanes, the alkaline condensation catalyst having been deactivated prior to devolatilization, and the said organopolysiloxane, which is convertible to the cured, solid, elastic state, contains an average of from about 1.98 to 2.01 silicon-bonded organic groups per silicon atom, wherein the organic groups are selected from the class consisting of monovalent hydrocarbon radicals and chlorinated hydrocarbon radicals, and (2) incorporating in said devolatilized organopolysiloxane a finely divided inorganic oxide filler.

2. The process which comprises (1) removing from a composition consisting essentially of an alkaline-condensed organopolysiloxane having a viscosity of at least 500,000 centipoises, the volatile low molecular weight organopolysiloxanes present therein and boiling below 250° C. when measured at 760 mm. to a point where less than 2%, by weight, of the convertible organopolysiloxane comprises the aforementioned volatile organopolysiloxanes, the alkaline condensation catalyst having been deactivated prior to devolatilization, and the said organopolysiloxane, which is convertible to the cured, solid, elastic state, contains an average of from about 1.98 to 2.01 silicon-bonded organic groups per silicon atom, wherein the organic groups are selected from the class consisting of monovalent hydrocarbon radicals and chlorinated hydrocarbon radicals, (2) incorporating a finely divided inorganic oxide filler and a curing agent in the devolatilized convertible organopolysiloxane, and (3) thereafter heating the mixture of ingredients for a time and at a temperature sufficient to effect conversion of the latter to the cured, solid, elastic state.

3. The process which comprises (1) removing from a composition consisting essentially of an alkaline-condensed methylpolysiloxane having a viscosity of at least 500,000 centipoises, the volatile low molecular weight methylpolysiloxanes present therein and boiling below 250° C. when measured at 760 mm. to a point where less than 2%, by weight, of the convertible methylpolysiloxane comprises the aforementioned volatile methylpolysiloxanes, the alkaline condensation catalyst having been deactivated prior to devolatilization, and the said methylpolysiloxane, which is convertible to the cured, solid, elastic state, contains an average of from about 1.98 to 2.01 silicon-bonded methyl groups per silicon atom, (2) incorporating a finely divided inorganic oxide filler and a curing agent in the devolatilized convertible methylpolysiloxane, and (3) thereafter heating the mixture of ingredients for a time and at a temperature sufficient to effect conversion of the latter to the cured, solid, elastic state.

4. The process which comprises (1) removing from a composition consisting essentially of an alkaline-condensed methyl phenylpolysiloxane having a viscosity of at least 500,000 centipoises, the volatile low molecular weight methyl phenylpolysiloxanes present therein and boiling below 250° C. when measured at 760 mm. to a point where less than 2%, by weight, of the convertible methyl phenylpolysiloxane comprises the aforementioned volatile methyl phenylpolysiloxanes, the alkaline condensation catalyst having been deactivated prior to devolatilization, and the said methyl phenylpolysiloxane, which is convertible to the cured, solid, elastic state, contains an average of from about 1.98 to 2.01 total silicon-bonded methyl and phenyl groups per silicon atom, (2) incorporating a finely divided inorganic oxide filler and a curing agent in the devolatilized convertible methyl phenylpolysiloxane and (3) thereafter heating the mixture of ingredients for a time and at a temperature sufficient to effect conversion of the latter to the cured, solid, elastic state.

5. The process as in claim 2 in which the filler is a finely divided silica and the curing agent is benzoyl peroxide present in an amount equal to from 0.5 to 8 percent, by weight, based on the weight of the convertible methylpolysiloxane.

6. The process which comprises heating in the presence of a curing agent at temperatures above 110° C. the devolatilized, filled, convertible organopolysiloxane described in claim 1.

References Cited in the file of this patent
UNITED STATES PATENTS

| | | |
|---|---|---|
| 2,405,041 | Mathes | July 30, 1946 |
| 2,460,795 | Warrick | Feb. 1, 1949 |
| 2,709,161 | Kilbourne et al. | May 24, 1955 |
| 2,739,952 | Linville | Mar. 27, 1956 |

OTHER REFERENCES

Rochow: "Introduction to The Chemistry of The Silicones," 2nd ed., page 95, Wiley (1951).